United States Patent
Alt et al.

[19]

[11] Patent Number: 5,870,259
[45] Date of Patent: Feb. 9, 1999

[54] DISK DRIVE LOAD BEAM STRUCTURE HAVING LIFT ROD AND HEAD MOUNTED ON SAME SIDE THEREOF

[75] Inventors: Robert A. Alt, Longmount; James A. Dunckley; David M. Furay, both of Boulder, all of Colo.

[73] Assignee: Mobile Storage Technology Inc., Boulder, Colo.

[21] Appl. No.: 785,235

[22] Filed: Jan. 17, 1997

[51] Int. Cl.⁶ .................................................... G11B 5/54
[52] U.S. Cl. ............................................................ 360/105
[58] Field of Search ............................................... 360/105

[56] References Cited

U.S. PATENT DOCUMENTS

| | | | |
|---|---|---|---|
| 4,663,682 | 5/1987 | McNeil | 360/105 |
| 5,289,325 | 2/1994 | Morehouse et al. | 360/105 |
| 5,530,607 | 6/1996 | Spendlove | 360/105 |

*Primary Examiner*—Craig A. Renner
*Attorney, Agent, or Firm*—Skjerven, Morrill, MacPherson, Franklin & Friel LLP; David W. Heid; Hugh H. Matsubayashi

[57] ABSTRACT

A disk drive apparatus includes actuator arms, each with a load beam mounted thereon, and a head mounted to a side of the load beam, with a lift rod mounted to that side of the load beam. An electrical conductor is connected to the head and extends along that side of the load beam. Each actuator arm defines a bore, and an annular member is included, having a first portion which is dimensioned to be an interference fit with a bore of the actuator arm, and a second portion adapted to cooperate with a portion of the actuator arm to hold a portion of the load beam therebetween with the first portion of the annular member positioned in the bore of the actuator arm. The disk drive apparatus includes a base and first and second covers on either side thereof, and a disk drive motor mounted to the base and extending from adjacent the first cover to adjacent the second cover. A voice coil actuator assembly extends from adjacent the first cover to adjacent the second cover.

6 Claims, 9 Drawing Sheets

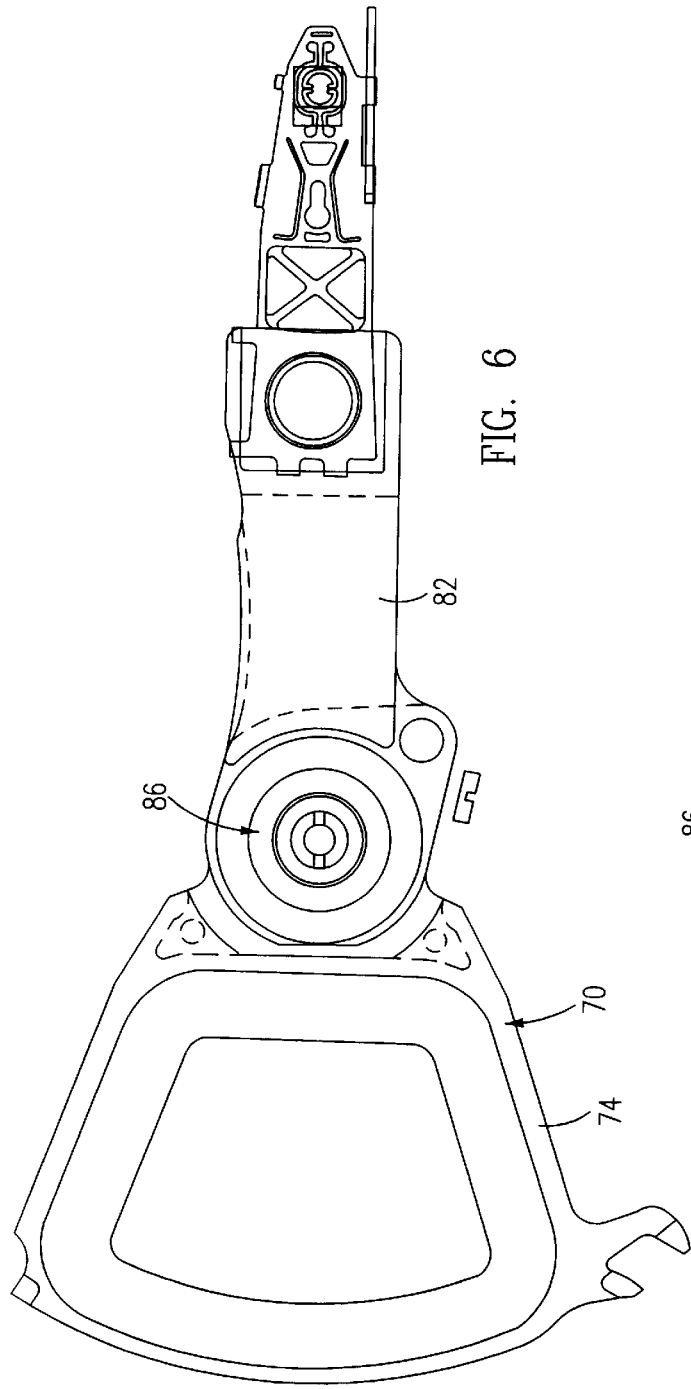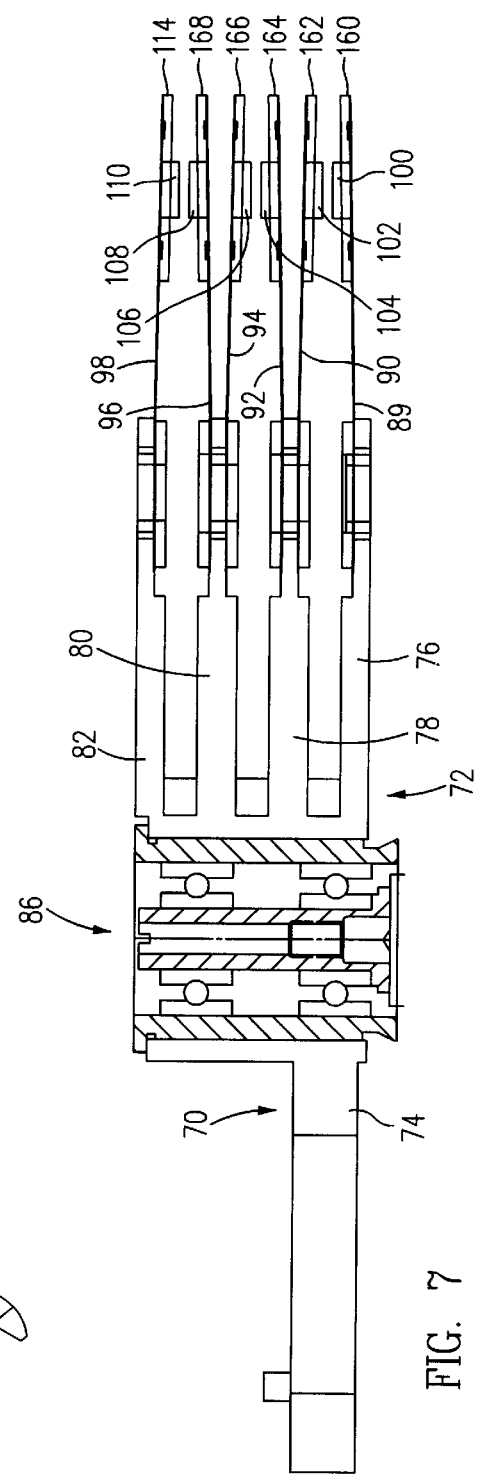

DISK DRIVE LOAD BEAM STRUCTURE HAVING LIFT ROD AND HEAD MOUNTED ON SAME SIDE THEREOF

FIELD OF THE INVENTION

This invention relates to a disk drive apparatus usable in place of a memory card in a personal computer, and, in particular, to a disk drive apparatus meeting the specifications established by the Personal Computer Memory Card International Association.

BACKGROUND OF THE INVENTION

Integrated circuit cards have become popular as a means of conveniently adding memory capacity to personal computers, particularly palm top, lap top, and notebook-size computers, as well as other devices such as modems, serial ports, cellular phone links, facsimile machines, application read-only memories, and the like. To promote compatibility among memory cards, physical, interface and software standards have been adopted by the Personal Computer Memory Card International Association (PCMCIA or PC-CARD) in the United States and by the Japan Electronics Industry Development Association (JEIDA). The PC-CARD Standard Release 2.01, published November, 1992, provides for three physical sizes, designated Type I, Type II and Type III, which are distinguished from each other primarily by specifying card thicknesses of 3.3, 5.0 and 10.5 millimeters maximum respectively. The memory cards are provided with a 68 pin socket connector at one end and are typically guided into place by a pair of channel guides which engage the side edges of the card.

With the Type III card thickness of 10.5 mm maximum specified above, a disk drive configured as a PC-CARD using three disks, as opposed to two as used in the past, would permit a substantially larger memory capacity to be added to the host computer. Heretofore, such a three disk approach within the constraints of the PCMCIA Type III dimension has proven difficult because of the numerous physical packaging constraints which have prohibited incorporating an increased number of heads and disks in the space available.

SUMMARY OF THE INVENTION

A disk drive apparatus in accordance with the present invention includes actuator arms, each with a load beam mounted thereon, and a head mounted to a side of the load beam, with a lift rod mounted to that side of the load beam. Electrical conductors are connected to the head and extend along that side of the load beam. The actuator arm defines a bore, and an annular member is included, having a first portion which is dimensioned to be an interference fit with the bore of the actuator arm, and a second portion adapted to cooperate with a portion of the actuator arm to hold a portion of the load beam therebetween with the first portion of the annular member positioned in the bore of the actuator arm. The disk drive structure apparatus include a base and first and second covers on either side thereof, and a disk drive motor mounted to the base and extending from adjacent the first cover to the adjacent second cover. A voice coil actuator assembly extends from adjacent the first cover to adjacent the second cover.

BRIEF DESCRIPTION OF THE DRAWINGS

FIG. 6 is an enlarged plan view of a portion of the apparatus of FIG. 1;

FIG. 7 is a side view of the apparatus of FIG. 6;

DESCRIPTION OF THE PREFERRED EMBODIMENTS

Figure 1:
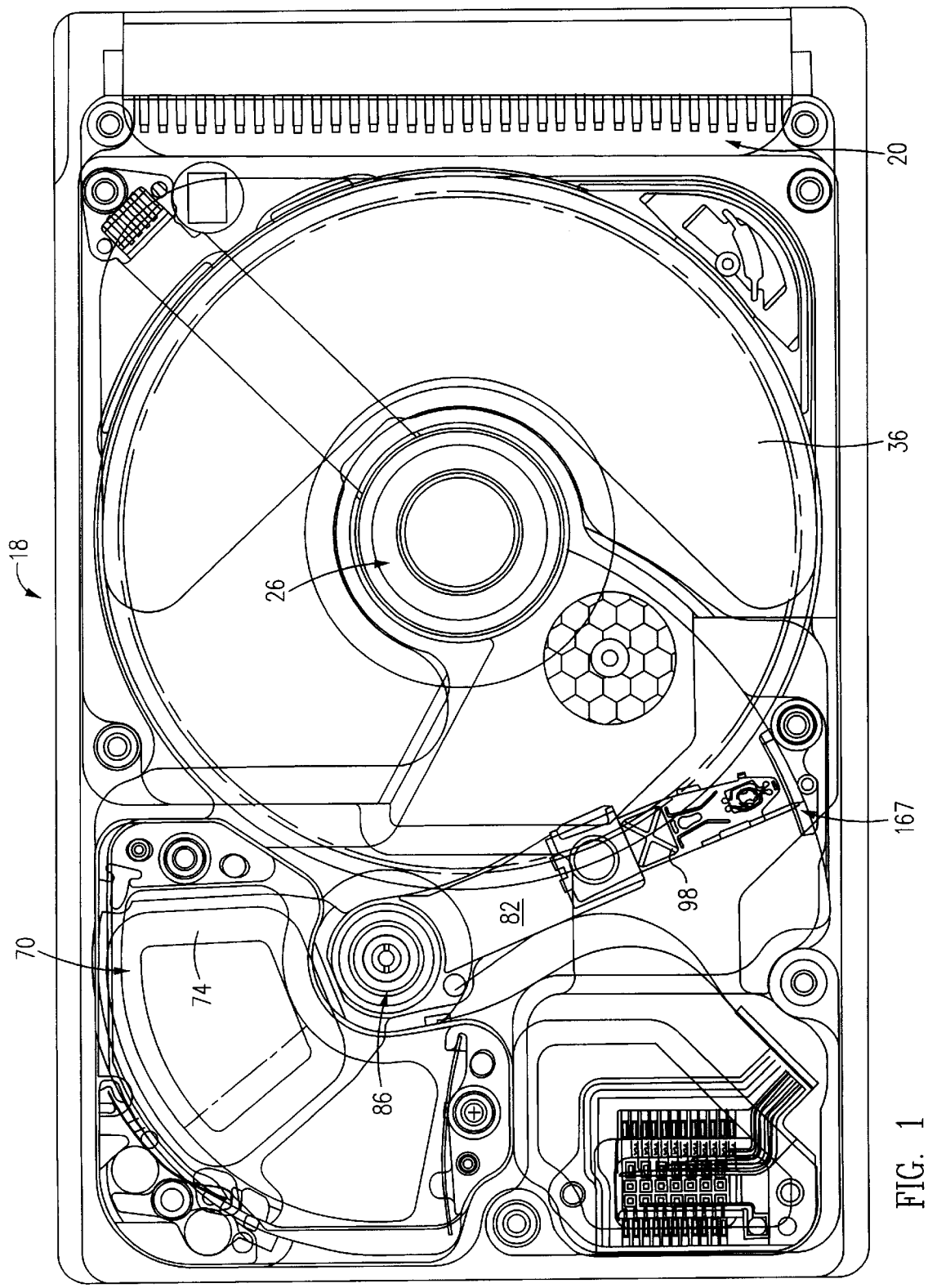
FIG. 1 is a plan view of a preferred embodiment of the invention.
Figure 2:
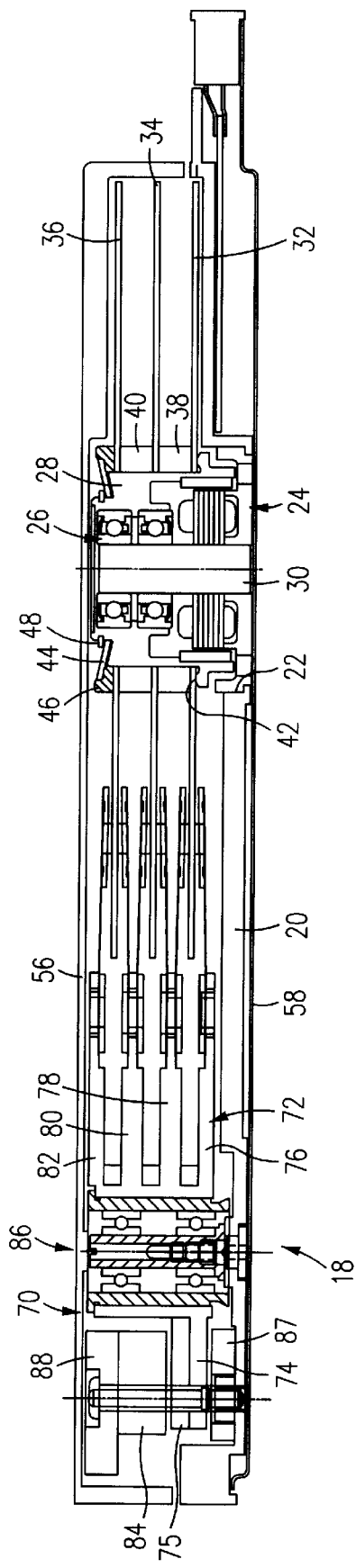
FIG. 2 is a sectional view of the apparatus of FIG. 1.

As shown in FIGS. 1 and 2, a disk drive 18 includes a base structure 20 which defines an aperture 22 in which the body 24 of a spin motor assembly 26 (FIG. 3) is mounted. The spin motor assembly 26 includes a spindle hub 28 rotatably mounted to the shaft 30 of the body 24, disposed through the center holes of data storage disks 32, 34, 36, which are positioned in spaced relation along the hub 28 by means of annular spacers 38, 40 disposed around the hub 28. The inner periphery of the data storage disk 32 rests on a generally radial surface 42 defined by the hub 28, and the disks 32, 34, 36 are held in position relative to the hub by means of a resilient spring member 44 bearing on a ring 46 which in turn bears on the inner periphery of the disk 36, which spring member 44 is held in place to bear on the ring 46 by a snap ring 48 disposed in an annular groove 50 defined by the spindle hub 28.

The hub 28 has an outside diameter less than the internal hole diameter of the 1.8" disks 32, 34, 36. In the ball bearing design of FIG. 3, two 3×7 mm bearings 52 are positioned as close as possible to the top of the motor 26 to allow maximum room for motor windings 54 and to improve non-operating shock performance.

Top and bottom covers 56, 58 are mounted to the base structure 20, and the spin motor 26, it will be noted, extends from adjacent one cover 56 to adjacent the other 58, using substantially the entire 10.5 mm height of the device 18.

Figure 3:
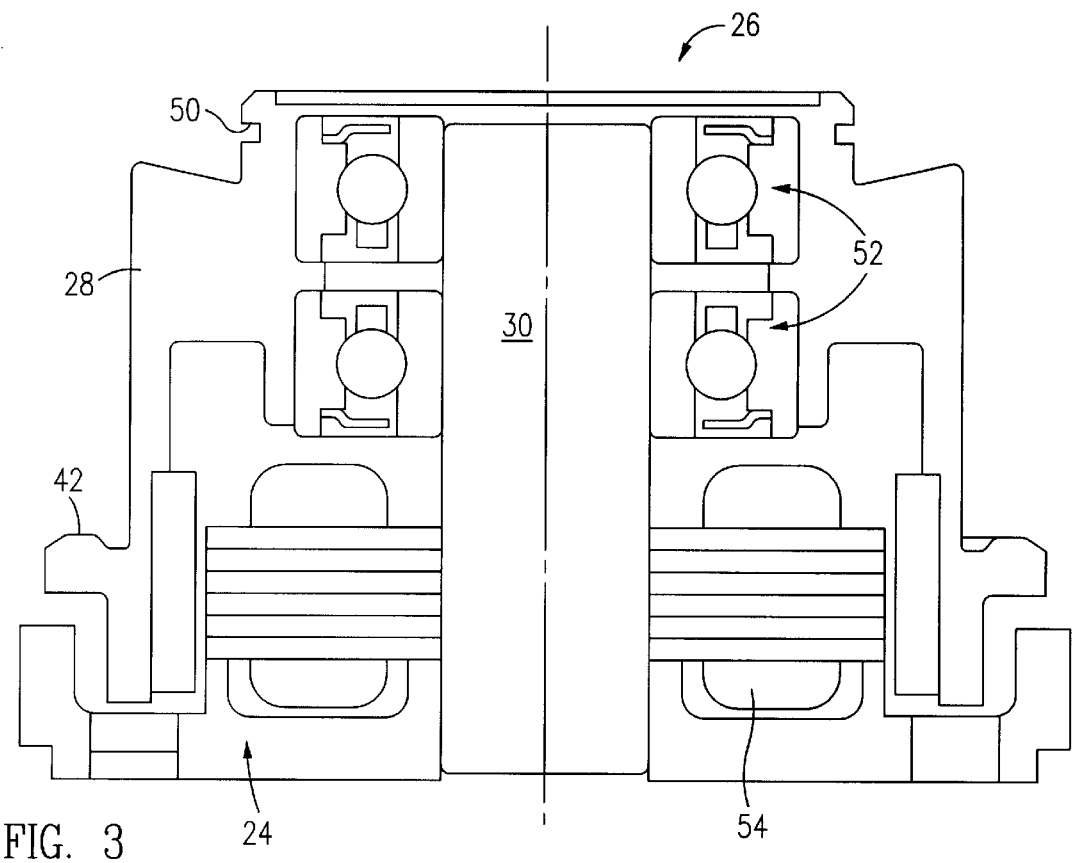
FIG. 3 is an enlarged sectional view of the spin motor of the apparatus of FIG. 2.
Figure 4:
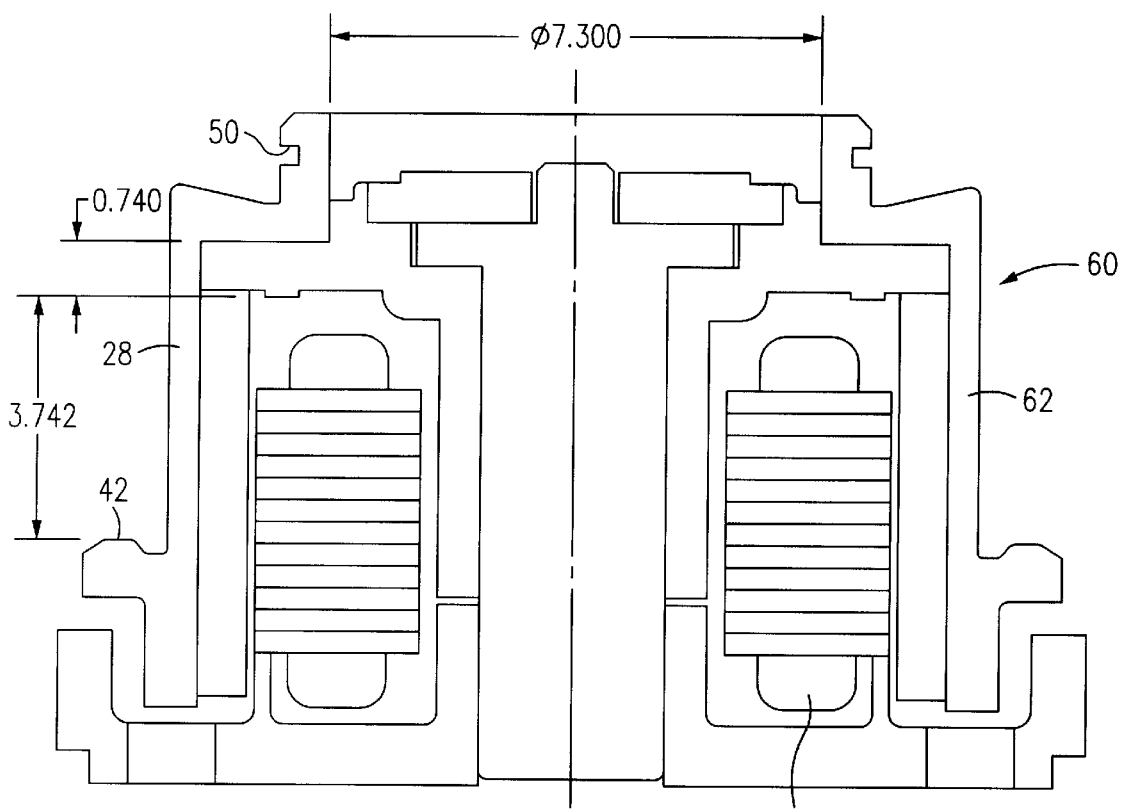
FIG. 4 is an enlarged sectional view of an alternative embodiment of spin motor.
Figure 5:
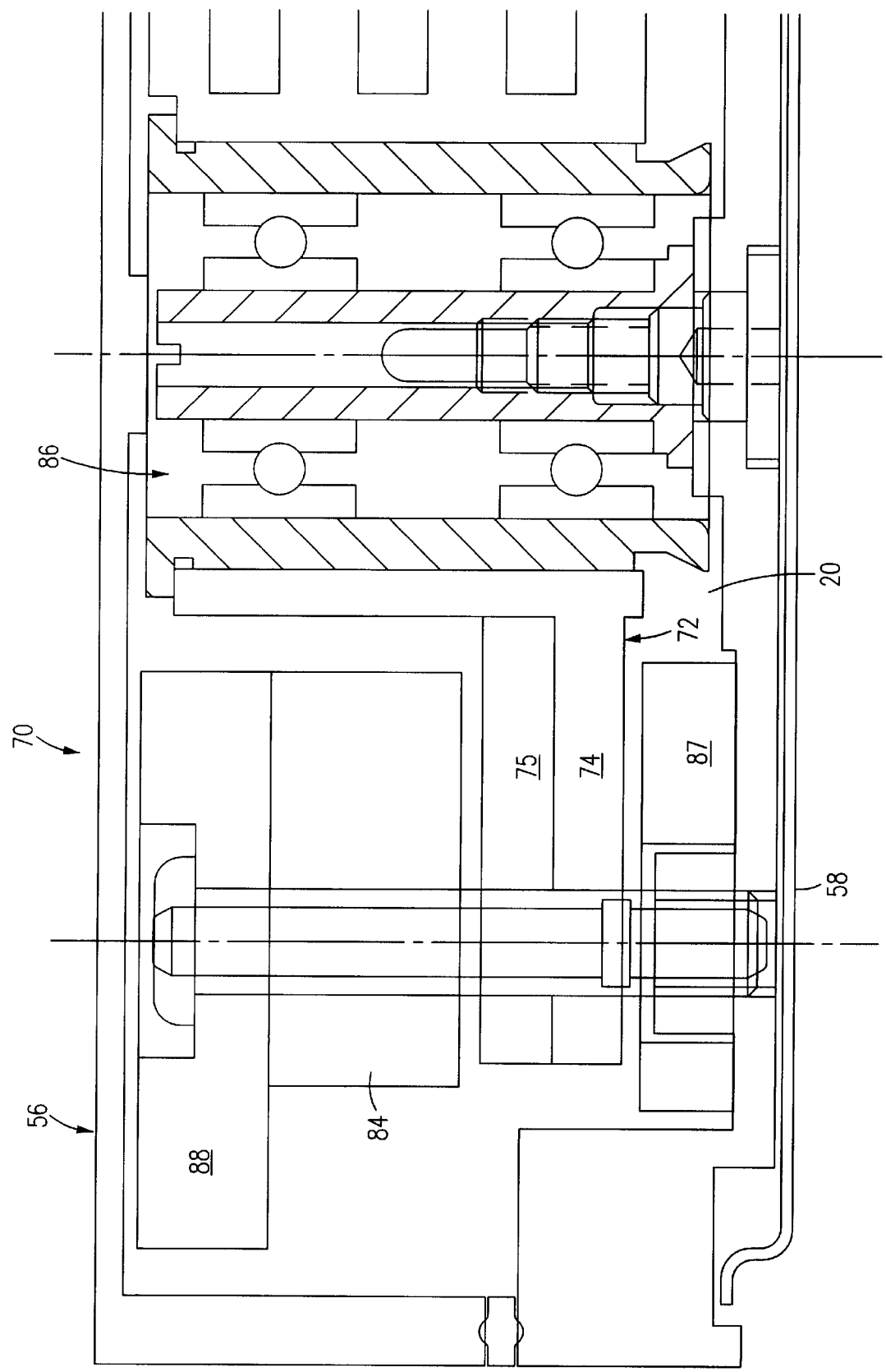
FIG. 5 is an enlarged sectional view of the voice coil actuator assembly of the apparatus of FIG. 2.

As an alternative to the ball bearing spin motor 26 of FIGS. 2 and 3, the fluid bearing spin motor 60 of FIG. 4 can be used.

In the fluid bearing design, the increased vertical volume can be used to maximize stator winding volume. Sintered neodymium, samarium, cobalt or other high energy ring magnets are used in the rotor 62 to minimize magnet volume and mass.

Disks used in the prior art typically have a thickness of 0.64 mm and use substrates of aluminum (such as 5086 alloy) or glass. Such disks are too thick for use in a Type III disk drive and in the present embodiment disks having a thickness of 0.381 mm (0.15") are used. Disk substrates can be made from either super finished aluminum alloy, or materials such as ceramic or glass, polished to less than 0.5 nm surface finish. Other materials which are void free and capable of sustaining a flat and highly polished surface finish may be used. For example, material such as direct sintered silicon carbide, other carbide materials, or material such as ceramic composites are suitable for the magnetic disk substrates. Other materials that are suitable include the class of materials known as metal matrix composites and silicon carbide fiber reinforced metals.

The magnetic recording surface of the disk is a sputtered cobalt alloy with a thickness of less than 20 nm over a NiP undercoat. An overcoat having a thickness of 5±1 nm is layered on top of the magnetic surface.

In order to reduce drive height, spacing between the disks is 1.925 mm as compared with 2.25 mm used in prior art drives.

With reference to FIGS. 1, 2, 5, 6 and 7 the voice coil actuator assembly 70 of the disk drive 18 is shown. The voice coil actuator assembly 70 includes an actuator body 72 made up of an actuator member 74 and actuator arms 76, 78, 80, 82, a voice coil 75 mounted to the actuator member 74, a single magnet 84, and dual flux return plates 87, 88, so that the actuator assembly 70 extends from adjacent the cover 56 to adjacent the cover 58, using substantially the entire 10.5 mm dimension of the apparatus 18. The unitary body 72 made up of the actuator arms 76, 78, 80, 82 and actuator member 74 is mounted to a bearing assembly 86 which in turn is mounted to the base structure 20.

Figure 8:
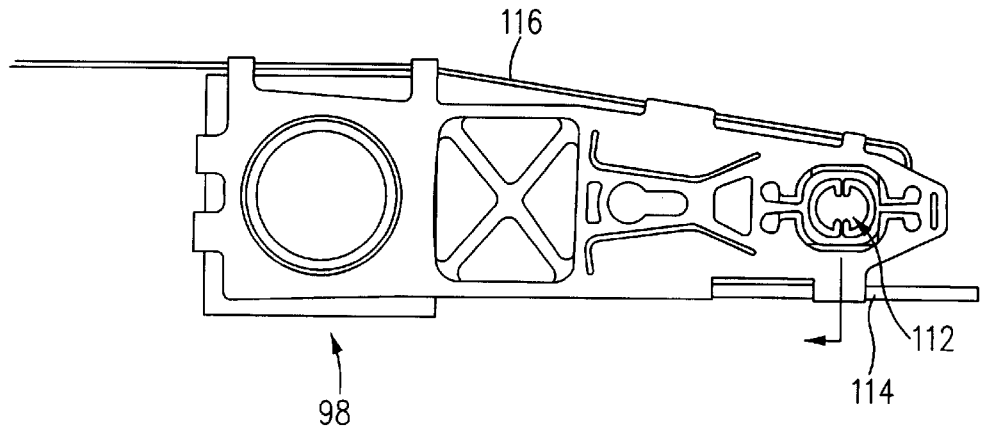
FIG. 8 is a plan view of a load beam of the apparatus.
Figure 9:
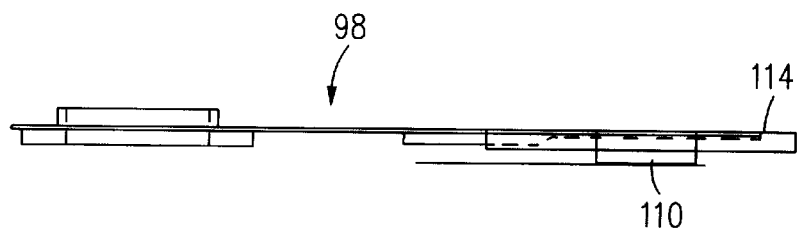
FIG. 9 is a side view of the apparatus of FIG. 8.
Figure 10:
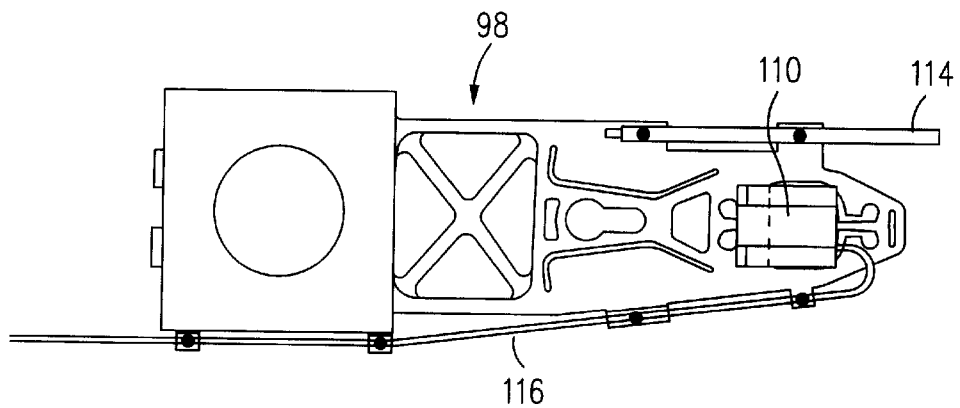
FIG. 10 is a bottom view of the apparatus of FIG. 8.

In turn mounted to the actuator arms 76, 78, 80, 82 are a plurality of load beams 89, 90, 92, 94, 96, 98 (FIGS. 7 and 8) to which are in turn respectively mounted the heads 100, 102, 104, 106, 108, 110 of the apparatus 18. The reduced dimensions require the use of 50% size heads, i.e., heads scaled dimensionally to about 50% of the size of heads used in IBM 3370 and 3380 model full sized disk drives.

Figure 14:
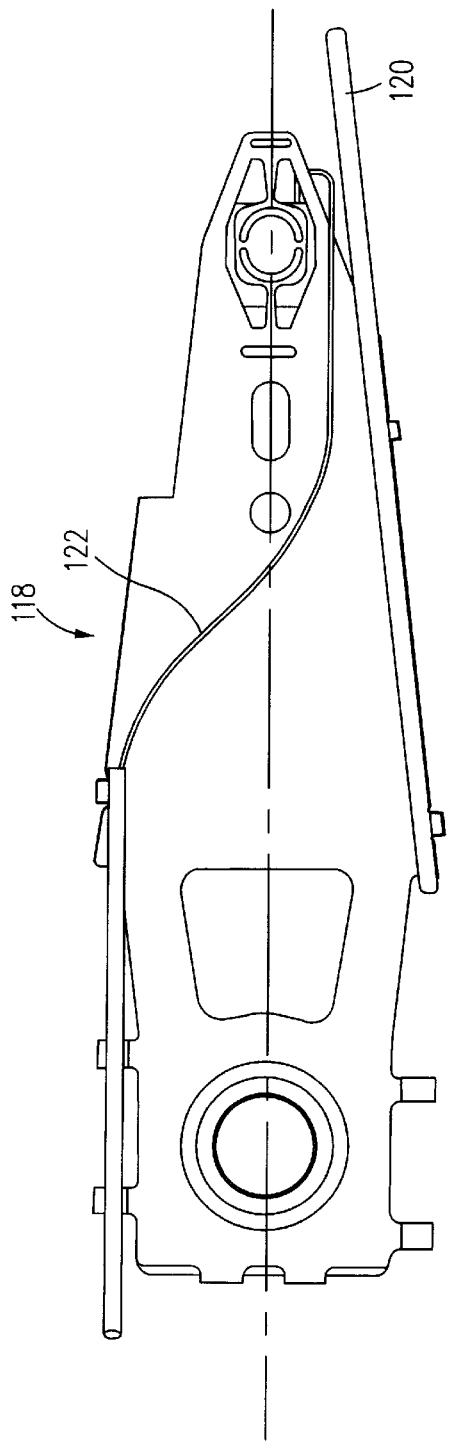
FIG. 14 is a plan view of a prior art load beam.
Figure 15:
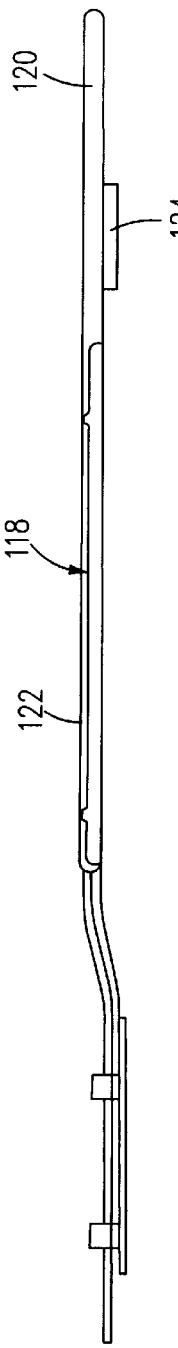
FIG. 15 is a side view of the prior art load beam of FIG. 14.

Each load beam, for example load beam 98, is formed by etching and stamping from a single piece of stainless steel incorporating an integrated head-gimbal structure 112. In such conventional load beam, features of gimbal mounting structure, head wires and unload rods extend in a direction away from the disk, so that such load beams in a back-to-back relationship must be spaced sufficiently apart to avoid interference therebetween. The present suspension is designed such that a 0.3 mm diameter lift rod 114, the head wires 116 and gimbal mounting flanges are affixed to the side of the suspension closest to the disk surface, in contrast to the prior art load beam 118 shown in FIGS. 14 and 15, including lift rod 120 on the edge of the load beam 118 and head wires 122 on the side of the load beam opposite the head 124. This feature allows the back-to-back head-gimbal assemblies to be mounted closer together without interference thereby allowing reduced spacing between disks. The reduced mass of the head-gimbal assembly further improves Z-axis operating shock performance. For example, the present suspension is able to withstand a vertical accelerative force of 213 grams before loss of contact with the disk as compared to 120 grams for prior art designs.

Figure 11:
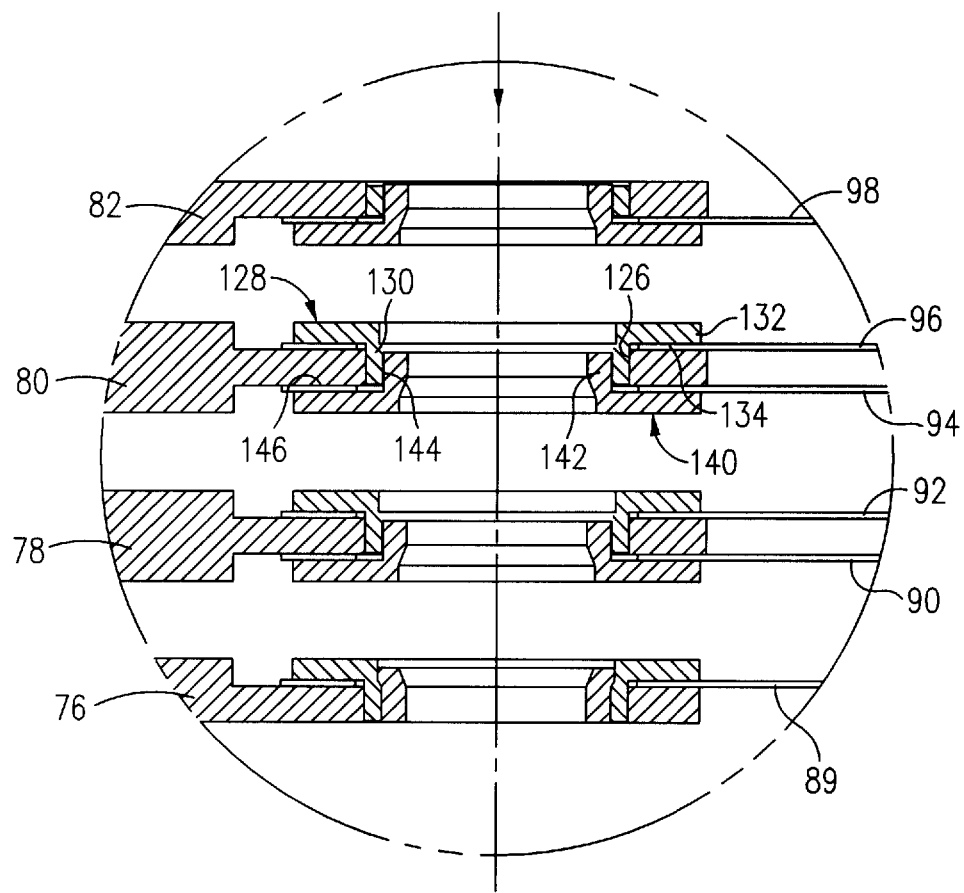
FIG. 11 is an enlarged sectional view of a portion of the apparatus of FIG. 2, showing the mounting of the suspension arms.

The system for mounting the load beams 89–98 to the actuator arms 76–82 is shown in detail in FIG. 11. As shown therein, for example with the actuator arm 80, load beams are disposed on either side thereof adjacent a bore 126 defined by the actuator arm 80. An annular member 128 has a first portion 130 which is sized to be an interference fit with the bore 126 of the actuator arm 80, and a second portion 132 defining a radial surface 134. With the first portion 130 positioned in the bore of the load beam 96 and into the bore 126 of the actuator arm 80, the radial surface 134 of the annular member 128 cooperates with the surface of the load beam 96 to hold the load beam 96 therebetween. Additionally, a second annular member 140 is included which has a portion 142 sized to be an interference fit with the internal bore 144 of the annular member 128, so that with such second annular member 140 positioned within the bore 144, the radial surface 146 thereof cooperates with the surface of the actuator arm 80 to hold the load beam 94 in position relative to the actuator arm 80. Such a design improves over the conventional method of attaching head-gimbal assemblies to the actuator arm, such as single sided staking, which may cause interference with a disk when disk-to-disk spacing is reduced. The present design maximizes the thickness of the actuator mounting tab while eliminating disk surface interference.

Figure 12:
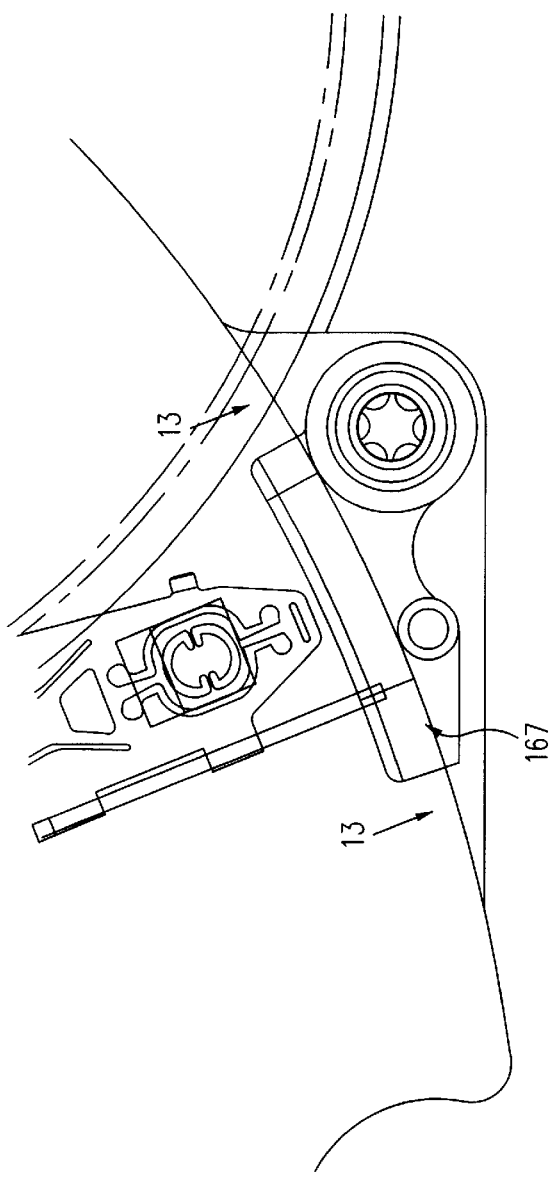
FIG. 12 is an enlarged plan view of a portion of the apparatus of FIG. 1.
Figure 13:
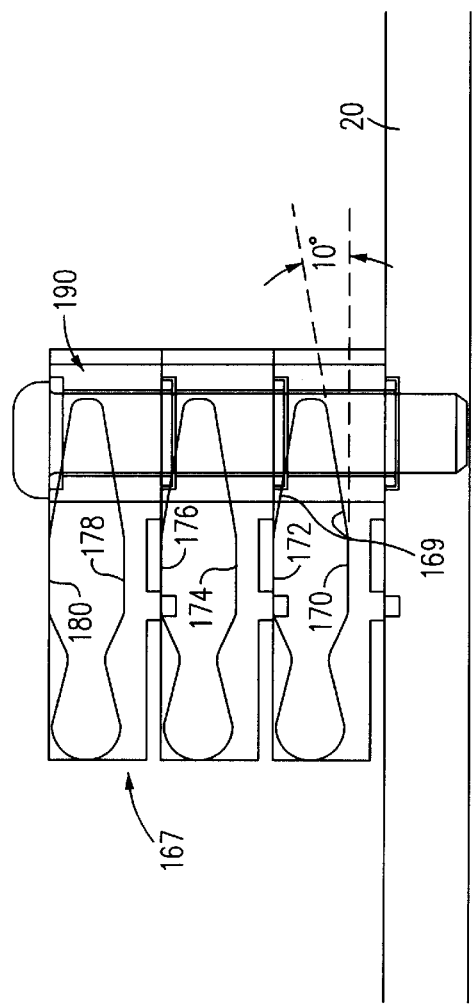
FIG. 13 is a view taken along the line 13—13 of FIG. 12.

The load-unload cam assembly 167 of the apparatus is shown in FIGS. 12 and 13. The six lift rods 160, 162, 164, 166, 168, 114 (FIG. 7) of the respective load beams 89–98 cooperate with six respective unloading cam surfaces 170, 172, 174, 176, 178, 180 of the cam assembly 167. The frictional force generated by the lift rods and the load/unload cam surfaces determines the maximum torque that the actuator assembly 70 must provide. This torque is generally larger than the required operating torque necessary for head seeking and is multiplied by the number of head-gimbal assemblies. Thus, a low friction cam assembly directly affects the design optimization of the voice coil actuator assembly 70. A precision molded polymer cam assembly 167 is provided, preferably molded from plastic, which is designed to maximize the usable radial sweep of the heads in order to provide as much recording area as possible. Also included is an insert molded aluminum tubular structure 190 which serves to prevent the cam assembly 167 from being distorted during installation and to provide improved dimensional stability. The cam assembly ramps as at 169 are at a 10° angle, as compared to for example 13° used in the prior art, to reduce head loading and unloading frictional force.

We claim:

1. A load beam structure comprising a load beam, a head mounted to a side of the load beam, and a lift rod mounted to the load beam on said side thereof, said lift rod having a longitudinal axis extending generally parallel to a longitudinal axis of said load beam.

2. A disk drive structure comprising:
    an actuator arm;
    a load beam mounted to the actuator arm;
    a head mounted to a side of said load beam; and
    a lift rod mounted to the load beam on said side thereof, said lift rod having a longitudinal axis extending generally parallel to a longitudinal axis of said load beam.

3. The disk drive structure of claim 2 wherein the lift rod extends beyond the head, and further comprising a base and a lift structure mounted to the base and adapted to receive an extended end of the lift rod when the actuator arm is moved from a disk surface.

4. The disk drive structure of claim 3 wherein the lift structure defines a surface which is contacted by the extended end of the lift rod when the actuator arm is moved from the disk surface, which lift structure surface is at an angle of substantially 10° from a line of movement of the extended end of the lift rod as said lift rod is moved from the disk surface.

5. The disk drive structure of claim 4 wherein the lift structure defines a recessed detent for receiving the extended end of the lift rod when the actuator arm is moved from the disk surface.

6. The disk drive structure of claim 3 wherein an end of the lift structure most adjacent an edge of a disk is spaced therefrom.

* * * * *